No. 870,973. PATENTED NOV. 12, 1907.
H. E. R. LITTLE.
STORAGE BATTERY.
APPLICATION FILED JAN. 17, 1907.

WITNESSES

INVENTOR
Homer E. R. Little
BY Munn & Co
ATTORNEYS

UNITED STATES PATENT OFFICE.

HOMER E. R. LITTLE, OF NEW YORK, N. Y.

STORAGE BATTERY.

No. 870,973.  Specification of Letters Patent.  Patented Nov. 12, 1907.

Application filed January 17, 1907. Serial No. 352,712.

*To all whom it may concern:*

Be it known that I, HOMER E. R. LITTLE, a citizen of the United States, and a resident of New York city, borough of the Bronx, county and State of New York, have invented a new and Improved Storage Battery, of which the following is a full, clear, and exact description.

This invention is directed to improvements in storage batteries, the nature of which provides for a considerable increase in electrical storage capacity and a material reduction in the weight of the cell, together with the use of such active materials that the operation of the battery may be economically carried on.

Storage batteries as usually constructed, especially those in which lead or a compound thereof is employed, are comparatively heavy and the yield of ampere hours is very small per pound of active material used. These disadvantages are largely overcome in the battery hereinafter described.

Reference is to be had to the accompanying drawings forming a part of this specification, in which similar characters of reference indicate corresponding parts in all the figures.

Figure 1:
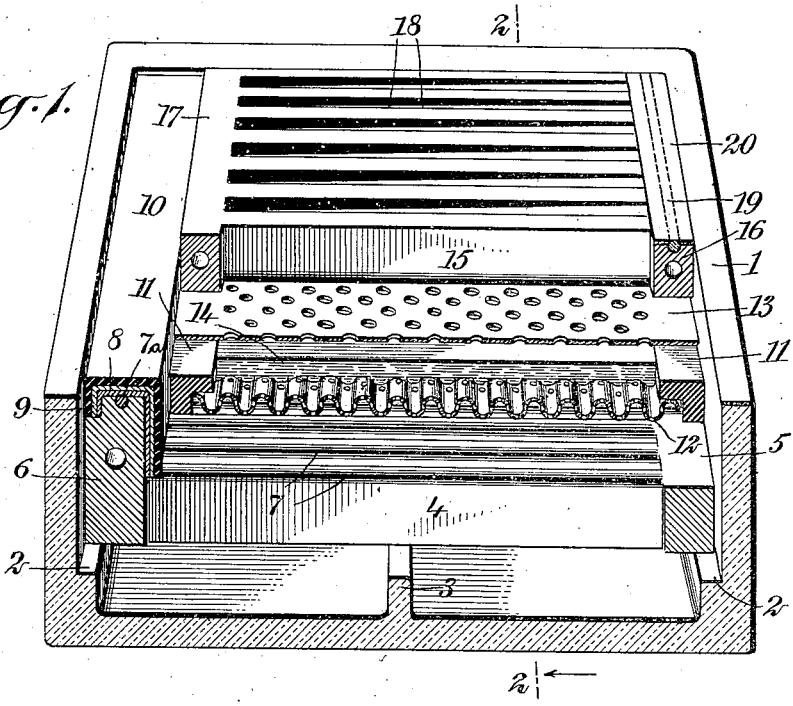
Figure 2:
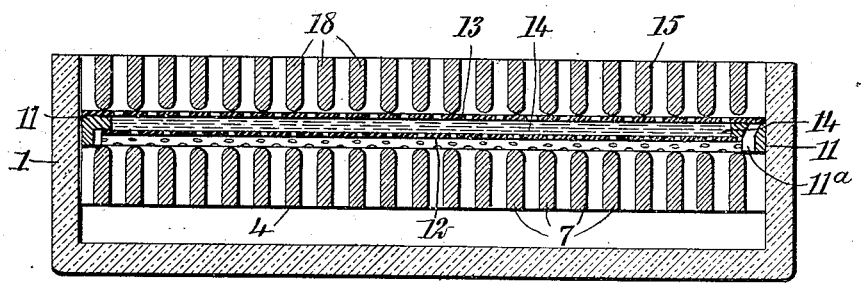
Figure 3:
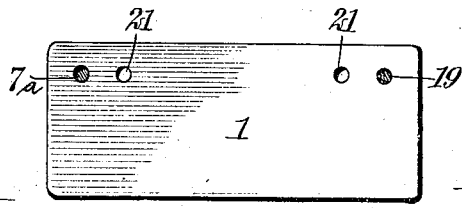

Figure 1 is a perspective view of one embodiment of my improved battery in transverse section; Fig. 2 is a section of the same substantially on the line 2—2 of Fig. 1, looking in the direction of the arrow, and Fig. 3 is a front end view of the cell.

The battery as preferably constructed, comprises a container or cell 1 of glass, and of rectangular form as shown. The sides of the container on their inner faces are rabbeted to provide shoulders 2, and a similar longitudinal rib 3 is formed intermediate thereof. This construction provides a substantial seat for supporting a positive electrode 4, the latter being of such extent as to cover the entire cell, and consists of a porous carbon body made up of end-bars 5 and 6 connected together by one or more crossbars 7, said crossbars being preferably rounded off on their top faces, as clearly disclosed in Fig. 2. The vertical dimension of the end-bar 6 is sufficient to carry it above the top of the crossbar 7 to within a short distance of the top edge of the cell. This end-bar is constructed with a rabbeted portion adjacent to the side of the cell, and is provided with a groove in its top face running its full length, in which a conductor 7ª is embedded. This conductor is secured in place by any suitable means, preferably by electroplating a coat of metal 8 which incloses the conductor and extends in the rabbeted portion of the end-bars 6 and at the opposite side thereof to the cross-bars 7. Covering this electro-plating is a thin coating of paraffin 9 or any insulating material which is itself inclosed by a rubber cap 10.

Resting on the cross-bars 7 of the positive electrode 4 is a framework consisting of strips 11 arranged adjacent to the cap 10 and to the opposite side of the container, as also at each end of the container, as shown in Fig. 2. These strips have openings 11ª for the escape of the generated gases, and are rabbeted on their under faces for receiving the ends of a hard rubber, corrugated and perforated plate 12. This plate in connection with a flat, perforated plate 13 of like material resting on the top face of the strips 11, provides a compartment which is filled with a fibrous material 14, preferably of asbestos. The object of this fiber, which is retained in place by the aforesaid plates, is to mechanically assist in keeping the different solutions separated which are afterward placed in the cell.

Resting on the perforated plate 13 and filling the space between the rubber cap 10 and the opposite side of the cell, is a negative electrode 15, which is also preferably made of carbon and consists of end-bars 16 and 17 joined together by one or more crossbars 18, the latter being rounded off on their under edges, as shown in Fig. 2. The end-bar 16 of this electrode which is adjacent to one side of the container, is provided with a longitudinal slot in its upper face, in which is embedded a conductor 19, which conductor is secured in place by a coating of metal 20, preferably zinc, and lectro-plated thereon. The conductors 7ª and 19 pass through openings in one end of the cell, as shown in Fig. 3, additional openings 21 being also provided in this end of the cell for the escape of generated gases.

The interior of the cell heretofore described provides for a chamber beneath the lower carbon of such size as the required capacity of the cell demands. This chamber is completely filled with carbon, tetra-chlorid, bromoform, chloroform or any liquid solvent of bromin of which the specific gravity is greater than a solution of zinc bromid which is thereafter poured into the cell to fill the interstices and cover the greater portion of the upper and negative electrode.

In charging the battery, the zinc from the zinc bromid solution is deposited on the electrode 15 and the bromin is liberated at the electrode 4, and since it is of higher specific gravity, falls to the surface of the carbon tetra-chlorid or other solution used, said solution having the property of extracting bromin from a bromid solution. When a cell is completely charged, the spaces between the lower carbon electrode are filled nearly to the top with a solution of carbon tetra-chlorid and the bromin liberated from the zinc bromid at this point.

When the cell discharges, the bromin is withdrawn from the solution of carbon tetra-chlorid and the zinc deposited on the negative electrode is combined therewith to again form zinc bromid, this operation repeatedly taking place on charging and discharging the battery.

Although I have described the preferred construction, I regard the precise embodiment of my invention as not material provided its essential characteristics are employed as pointed out in the annexed claims.

Having thus described my invention I claim as new and desire to secure by Letters Patent:

1. The combination of a cell, electrodes therein, a liquid halogen derivative, and a solution of a zinc salt of less specific gravity superposed thereon in said cell, said halogen derivative being a solvent for the radical element of the salt, whereby when the cell is charged the zinc is deposited on one of the electrodes and the radical element of the salt taken in solution by the halogen derivative, and when the cell is discharged, the zinc and the radical element taken in solution by the halogen derivative are again combined.

2. The combination of a cell, electrodes therein, carbon tetra-chlorid, and a solution of a zinc salt of less specific gravity superposed thereon in said cell, the carbon tetra-chlorid being a solvent for the radical element of the salt, whereby when the cell is charged, the zinc is deposited on one of the electrodes and the radical element of the salt taken in solution by the carbon tetra-chlorid, and when the cell is discharged, the zinc and the radical element taken in solution by the carbon tetra-chlorid are again combined.

3. The combination of a cell, an electrode horizontally disposed therein, composed of end-bars connected together by side-bars, one of said end-bars having an extended portion with a conductor connected therewith, a second electrode arranged in said cell above the first and consisting of end-bars connected together by cross-bars, a conductor connected with said second electrode, and two perforated plates having a fibrous material therebetween interposed between said electrodes for mechanically assisting in the separation of the liquids employed in the cell.

4. The combination of a cell, electrodes therein, carbon tetra-chlorid in the bottom of the cell in contact with one of said electrodes, and a solution of zinc bromid superposed on the carbon tetra-chlorid and in contact with the other electrode whereby when the cell is charged the zinc from the zinc bromid is deposited on the upper electrode and the bromin from the zinc bromid is taken in solution by the carbon tetra-chlorid, and when the cell is discharged the zinc deposited on the upper electrode combines with the bromin taken in solution to again form zinc bromid.

5. The combination of a cell, electrodes therein, carbon tetra-chlorid in the bottom of the cell in contact with one of said electrodes, a solution of zinc bromid superposed on the carbon tetra-chlorid in contact with the other electrode, and means interposed between the electrodes for mechanically assisting in the separation of the two liquids, whereby when the cell is charged, the zinc from the zinc bromid is deposited on the upper electrode and the bromin from the zinc bromin is taken in solution by the carbon tetra-chlorid, and when the cell is discharged, the zinc deposited on the upper electrode combines with the bromin taken in solution to again form zinc bromid.

6. The combination of a cell, a carbon electrode horizontally disposed therein, composed of end-bars connected together by side-bars, one of said end-bars having an extended portion, a conductor embedded in said extended portion, an electro-plating in contact therewith, an insulation surrounding the electro-plating, a second electrode arranged above the first in contact with said insulation and consisting of end-bars connected together by crossbars, a conductor embedded in said second electrode, and electro-plating in contact therewith.

7. The combination of a cell, a carbon electrode horizontally disposed therein comprising end-bars connected together by crossbars, one of said end-bars having an extended portion, a conductor embedded in said portion, electro-plating covering said extended portion in contact with said conductor, an insulation covering said electro-plating, a rubber cap fitting over said insulation, a second electrode consisting of end-bars connected together by crossbars arranged above the first electrode and in contact with said rubber cap, a conductor embedded in said second electrode, electro-plating in contact with said conductor, and a layer of fibrous material interposed between said electrodes.

In testimony whereof I have signed my name to this specification in the presence of two subscribing witnesses.

HOMER E. R. LITTLE.

Witnesses:
W. W. HOLT,
JNO. M. RITTER.